US011608155B2

(12) United States Patent
Mills et al.

(10) Patent No.: US 11,608,155 B2
(45) Date of Patent: *Mar. 21, 2023

(54) OFFSET FLANGE FLOOR PANEL CONNECTION SYSTEM

(71) Applicant: The Boeing Company, Chicago, IL (US)

(72) Inventors: Christopher J. Mills, Charleston, SC (US); Emily Yang, Ladson, SC (US); Michael Patrick Durbin, Summerville, SC (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,991

(22) Filed: Jul. 20, 2020

(65) Prior Publication Data

US 2020/0346734 A1     Nov. 5, 2020

Related U.S. Application Data

(62) Division of application No. 15/595,923, filed on May 15, 2017, now Pat. No. 10,717,515.

(51) Int. Cl.
   *B64C 1/18*           (2006.01)
   *B64D 11/06*        (2006.01)

(52) U.S. Cl.
   CPC ............ *B64C 1/18* (2013.01); *B64D 11/0696* (2013.01)

(58) Field of Classification Search
   CPC .............................. B64C 1/18; B64D 11/0696
   See application file for complete search history.

(56) References Cited

U.S. PATENT DOCUMENTS 2,403,247 A    7/1946   Sullivan
2,607,447 A    8/1952   Tuttle
(Continued)

FOREIGN PATENT DOCUMENTS

EP    1562261 A2    8/2005
EP    2275692 B1    3/2014
(Continued)

OTHER PUBLICATIONS

U.S. Patent and Trademark Office, Provisional Application in U.S. Appl. No. 60/357,292, filed Feb. 15, 2002 by Travis McClure, 7 pages.
(Continued)

*Primary Examiner* — Jessica B Wong
(74) *Attorney, Agent, or Firm* — Kolisch Hartwell, P.C.

(57) ABSTRACT

A floor panel connection system for attaching a floor panel to an airframe is disclosed. The connection system includes an offset flange insert comprising a base portion, a flange portion, and an interconnect portion. The base portion of the insert is configured to be received in a hole in an edge region of the floor panel and includes an opening that is sized to receive a fastener. The interconnect portion extends laterally from the base portion such that when the edge portion of the floor panel is overlapping a lateral edge portion of the airframe, the flange portion of the insert is beyond the lateral edge portion. The flange portion is also configured to be bonded to a bottom surface of the floor panel beyond the lateral edge portion of the airframe.

20 Claims, 3 Drawing Sheets

(56) References Cited

U.S. PATENT DOCUMENTS

| | | |
|---|---|---|
| 2,892,376 A | 6/1959 | Schonfeld |
| 3,922,946 A | 12/1975 | Grayson |
| 4,399,642 A | 8/1983 | Bard et al. |
| 4,478,546 A | 10/1984 | Mercer |
| 4,479,621 A | 10/1984 | Bergholz |
| 4,537,542 A | 8/1985 | Pratt et al. |
| 4,577,450 A | 3/1986 | Large |
| 4,934,885 A | 6/1990 | Woods et al. |
| 4,975,014 A | 12/1990 | Rufin et al. |
| 5,014,934 A | 5/1991 | McClaflin |
| 5,090,857 A | 2/1992 | Dunn |
| 5,164,154 A | 11/1992 | Brown et al. |
| 5,634,754 A | 6/1997 | Weddendorf |
| 5,788,443 A | 8/1998 | Cabahug |
| 6,264,412 B1 | 7/2001 | Nakamura et al. |
| 6,290,445 B1 | 9/2001 | Duran et al. |
| 6,474,920 B2 | 11/2002 | Lin |
| 6,595,734 B2 | 7/2003 | Durin et al. |
| 7,338,013 B2 | 3/2008 | Vetillard et al. |
| 7,967,251 B2 | 8/2011 | Wood |
| 7,988,395 B2 | 8/2011 | Steffier |
| 8,342,787 B2 | 1/2013 | Smith |
| 8,360,362 B2 | 1/2013 | Kismarton et al. |
| 8,444,359 B2 | 5/2013 | Grether et al. |
| 9,217,452 B1 | 12/2015 | Woodall, Jr. et al. |
| 10,717,515 B2 * | 7/2020 | Mills .................... B64C 1/18 |
| 2002/0050105 A1 | 5/2002 | McCorkle et al. |
| 2002/0144574 A1 | 10/2002 | Avetisian et al. |
| 2003/0231301 A1 * | 12/2003 | Floyd ................ G01N 21/8803 356/237.1 |
| 2005/0200066 A1 | 9/2005 | McClure |
| 2009/0169337 A1 | 7/2009 | LaConte et al. |
| 2009/0180831 A1 | 7/2009 | Kendall |
| 2012/0061513 A1 | 3/2012 | Gallant et al. |
| 2012/0225408 A1 | 9/2012 | Moore |
| 2012/0230796 A1 | 9/2012 | McClure |
| 2013/0039716 A1 | 2/2013 | McClure |
| 2013/0084130 A1 | 4/2013 | McClure |
| 2013/0092793 A1 | 4/2013 | Braeutigam |
| 2013/0094921 A1 | 4/2013 | McClure |
| 2014/0086704 A1 | 3/2014 | Hemingway et al. |
| 2019/0162225 A1 | 5/2019 | Etling et al. |

FOREIGN PATENT DOCUMENTS

| | | |
|---|---|---|
| EP | 2733061 A1 | 5/2014 |
| FR | 2755483 B1 | 4/2004 |
| FR | 3025178 A1 | 3/2016 |
| JP | H06298186 A | 10/1994 |
| RU | 2440278 C1 | 1/2012 |
| WO | 2004037483 A1 | 5/2004 |
| WO | 2010027439 A2 | 3/2010 |
| WO | 2010033149 A2 | 3/2010 |
| WO | 2010134946 A2 | 11/2010 |
| WO | 2011031283 A2 | 3/2011 |
| WO | 2013120156 A1 | 8/2013 |
| WO | 2015130533 A1 | 9/2015 |

OTHER PUBLICATIONS

Soodrich Interiors, Installation Instructions and Limitations for Model 2787 Track-Mounted Cabin Attendant Seat for Boeing 787 Aircraft, Dec. 9, 2008, 8 pages.

Avibank, New Product Bulletin for E-Nut Fastening System, Jan. 23, 2009, 5 pages.

European Patent Office, Extended European Search Report on European Patent Application No. 18177708.7-1010, dated Oct. 31, 2018, 7 pages.

European Patent Office, Examination Report regarding European Patent Application No. 18 177 708.7-1010, dated Sep. 16, 2019, 4 pages.

U.S. Patent and Trademark Office, Non-Final Office Action regarding U.S. Appl. No. 15/595,923 dated Nov. 6, 2019, 30 pages.

U.S. Patent and Trademark Office, Non-Final Office Action regarding U.S. Appl. No. 15/643,425, dated Jan. 6, 2020, 30 pages.

U.S. Patent and Trademark Office, Non-Final Office Action regarding U.S. Appl. No. 15/595,804 dated Mar. 3, 2020, 33 pages.

* cited by examiner

OFFSET FLANGE FLOOR PANEL CONNECTION SYSTEM

CROSS-REFERENCE

This application is a divisional application of U.S. patent application Ser. No. 15/595,923, filed May 15, 2017 and issued as U.S. Pat. No. 10,717,515 on Jul. 21, 2020. The complete disclosure of the above-identified patent application is hereby incorporated by reference for all purposes.

FIELD

This disclosure relates to floor panel inserts. More specifically, the disclosed examples relate to systems and methods for fastening floor panels to an aircraft floor support structure.

INTRODUCTION

Airplane floors typically consist of honeycomb sandwich floor panels fastened to floor structures referred to as seat tracks. During operation of an airplane, the floor panels accommodate a variety of forces, or loads from sources such as air pressure differences, people walking on the floor, or attached seats undergoing acceleration and deceleration of the plane. One function of floor panels is to transfer these loads to the body of the airplane. Examples of airplane floors are disclosed in U.S. Pat. No. 8,360,362. A fastening system typical of current technology is disclosed in U.S. Pat. No. 8,075,234. A fastener assembly is disclosed with a collet body used to fasten two objects with circular apertures together. A sleeve insert is secured in an aperture of a first object and the collet is inserted through the sleeve insert and an aperture of a second object. A stud is used to radially expand the fingers of the collet body. The fingers each include a protruding portion that engages the second object, while the head engages the first object, through the sleeve insert.

Such current technology often includes a flange on the sleeve insert, which may cause a gap between a large portion of the floor panel bottom face sheet and the seat track. This may lead to concentrated forces on the floor panel, around the flange.

SUMMARY

A floor panel connection system for attaching a floor panel to an airframe is disclosed. The connection system includes an offset flange insert comprising a base portion, a flange portion, and an interconnect portion. The airframe has a lateral edge portion with a plurality of apertures, and the floor panel has an edge region configured for overlapping engagement with the lateral edge portion.

The base portion of the insert is configured to be received in a hole in the edge region of the floor panel and includes an opening that is sized to receive a fastener. The interconnect portion extends laterally from the base portion such that when the edge portion of the floor panel is overlapping the lateral edge portion of the airframe, the flange portion of the insert is beyond the lateral edge portion. The flange portion is also configured to be bonded to a bottom surface of the floor panel beyond the lateral edge portion when the floor panel and airframe are in overlapping engagement.

An insert configured to be received in a hole of an aircraft panel is also disclosed, comprising a base portion, a planar flange portion, and an interconnect portion. The base portion has an opening that is sized to receive a fastener and defines a vertical axis. The interconnect portion is disposed between the base portion and the flange portion. The flange portion is within a plane perpendicular to the vertical axis such that the base portion and the interconnect portion are not within the plane.

A method of resisting loads on an aircraft floor panel comprises positioning an offset flange insert in the hole of the floor panel, then overlapping the edge region of the floor panel with the lateral edge portion of the airframe such that the opening of the insert is aligned with an aperture of the lateral edge portion of the airframe. The method further includes inserting a fastener through the opening of the insert and the aperture of the airframe.

The present disclosure provides various apparatuses and methods of use thereof. In some examples, a floor panel connection system may include an offset flange insert comprising a base portion, an interconnect portion extending laterally from the base portion, and a flange portion formed on the interconnect portion. In some examples, the flange portion may be kidney-shaped to complement a scalloped lateral edge portion of the airframe. In some examples, the flange portion may lie in a plane separate from the base portion and the interconnect portion.

Features, functions, and advantages may be achieved independently in various examples of the present disclosure, or may be combined in yet other examples, further details of which can be seen with reference to the following description and drawings.

DESCRIPTION

Overview

Figure 1:
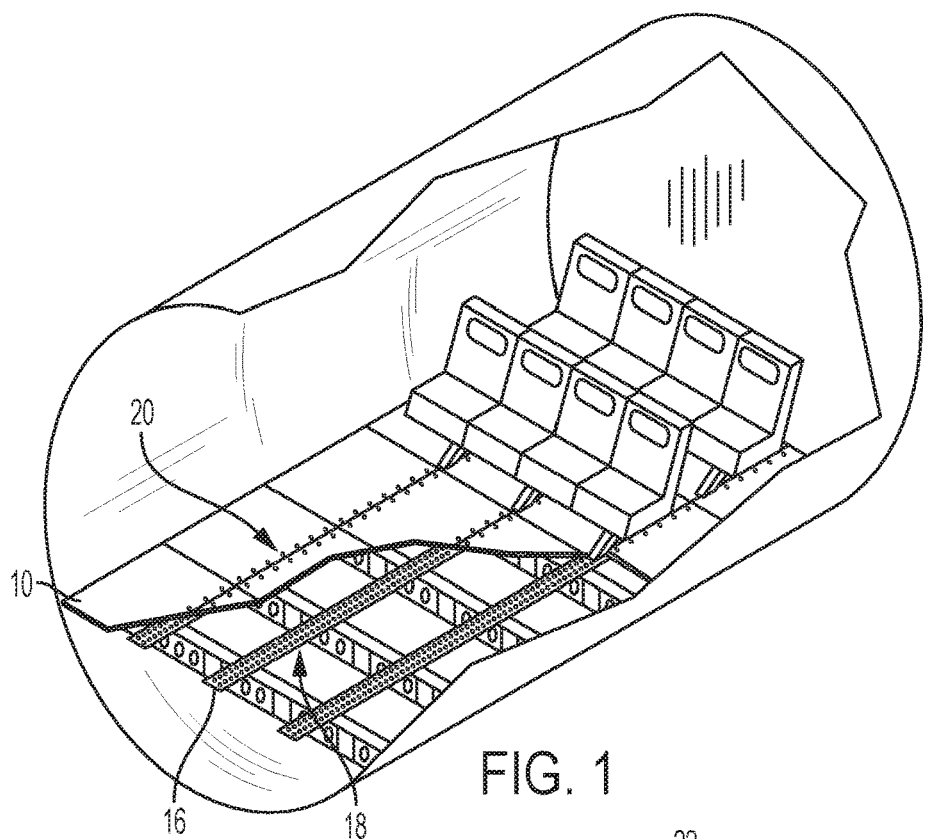
FIG. 1 is a partial, cut away isometric view of an illustrative airplane cabin.

FIG. 1 shows an illustrative airplane cabin, with seats mounted on a floor of multiple assembled floor panels. Below the floor panels, multiple seat tracks extend longitudinally through the cabin, and each floor panel spans from one seat track to an adjacent seat track. In other areas of the airplane, different airframe components may support the assembled floor panels. Disclosed floor panel connection systems may be used to connect aircraft floor panels to any airframe component that has appropriately dimensioned, and spaced, arrays of holes or apertures in one or more lateral edge regions. An airframe component may take the form of a floor panel support structure, for example, a seat track.

A typical floor panel 10 includes an edge region 12 that overlaps a lateral edge portion 14 of a seat track 16. A plurality of seat track apertures 18 are formed along lateral edge portion 14, and a plurality of floor panel apertures 20 are formed along edge region 12. Floor panel apertures 20 correspond to some or all of seat track apertures 18 and floor panel 10 is disposed on seat track 16 such that corresponding apertures are aligned. A plurality of offset flange inserts with fasteners extending through the corresponding apertures connect floor panel 10 to seat track 16.

Any number of offset flange inserts may be used, and may extend through all corresponding floor panel apertures 20 and seat track apertures 18 or only some of the corresponding apertures. Other coupling devices or fasteners may be used in conjunction with offset flange inserts, alternating with the inserts or at different locations along floor panel edge region 12.

Figure 2:
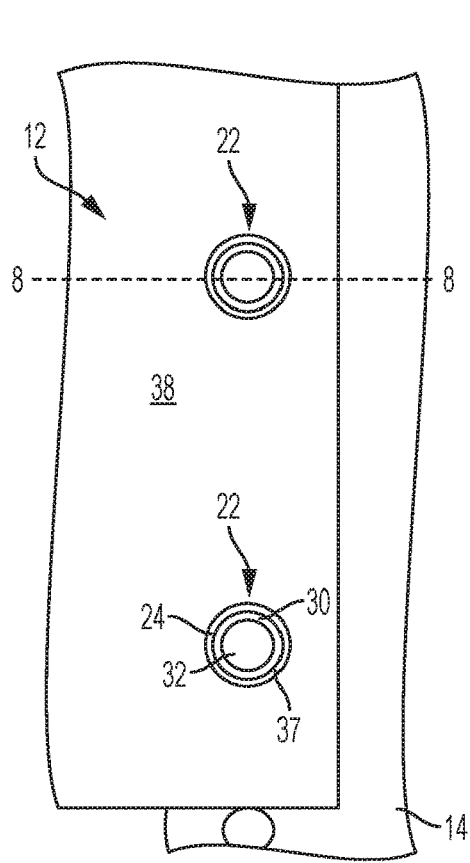
FIG. 2 is a detailed top plan view of a floor panel of the airplane cabin of FIG. 1.
Figure 3:
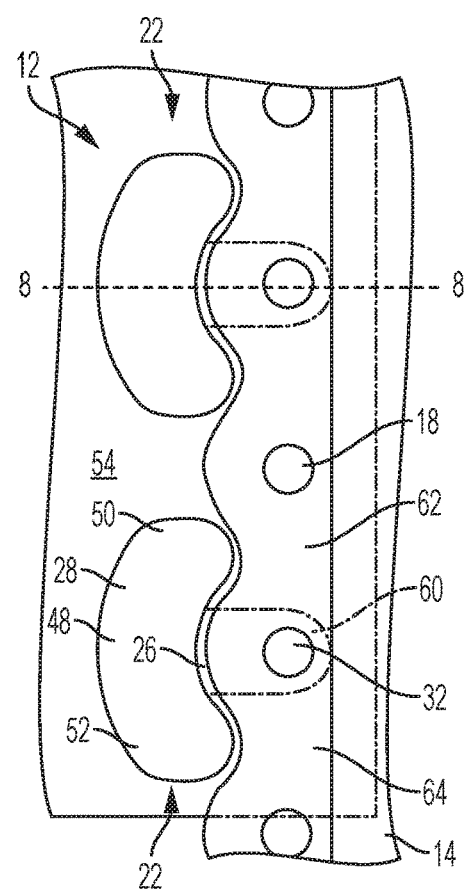
FIG. 3 is a detailed bottom plan view of the floor panel of FIG. 2.

An offset flange insert 22 comprises a base portion 24, an interconnect portion 26, and a flange portion 28, which may be referred to as a base, an interconnect, and a flange, respectively. FIGS. 2 and 3 show an overlap of floor panel 10 and seat track 16 from above and below respectively, including two offset flange inserts 22. Base 24 is received in one hole 30 of the plurality of floor panel apertures 20. Interconnect 26 extends out laterally from the base such that flange 28 is beyond lateral edge 14 of seat track 16. Flange 28 is bonded to floor panel 10.

Figure 4:
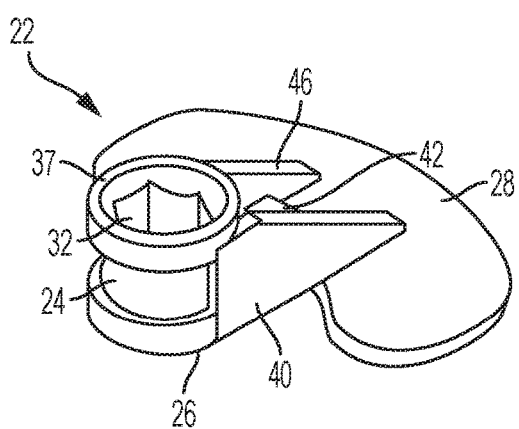
FIG. 4 is an isometric view of an example of an offset flange insert.
Figure 5:
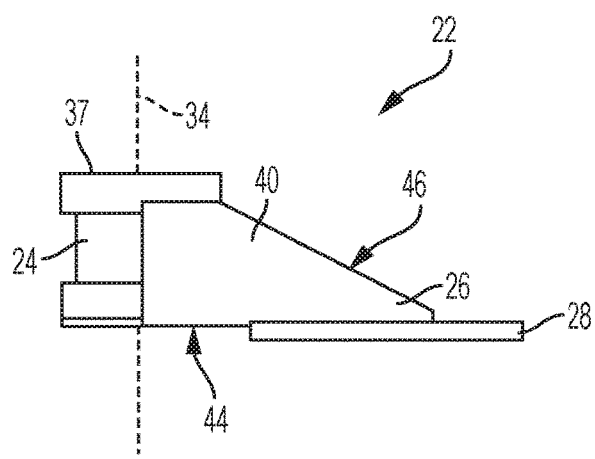
FIG. 5 is a side view of the offset flange insert of FIG. 4.
Figure 6:
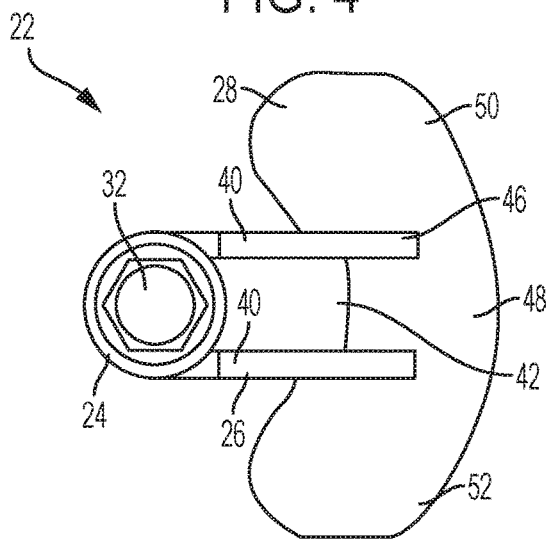
FIG. 6 is a top view of the offset flange insert of FIG. 4.

An example of an offset flange 22 is shown from a variety of angles in FIGS. 4-6. Base 24, interconnect 26, and flange 28 are integrally formed together. Base 24 is substantially cylindrical, with a central opening 32 that defines a vertical axis 34.

Base 24 is also configured to be received in hole 30 of floor panel 10. The base may fit tightly enough to inhibit admission of dust and grit, without impeding insertion of base 24 into hole 30. A top end 37 of base 24 may lie flush with a top surface 38 of floor panel 10. Alternatively, in an example not shown, hole 30 may include a lip that overlaps base 24, but not opening 32.

Figure 7:
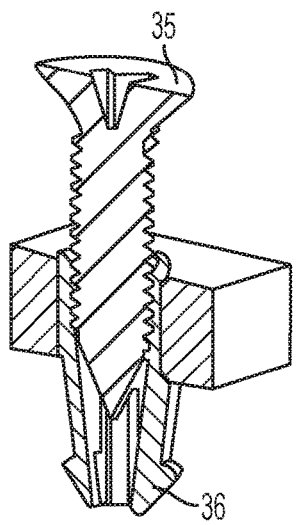
FIG. 7 is an isometric cross-sectional view of an illustrative blind fastener.
Figure 8:
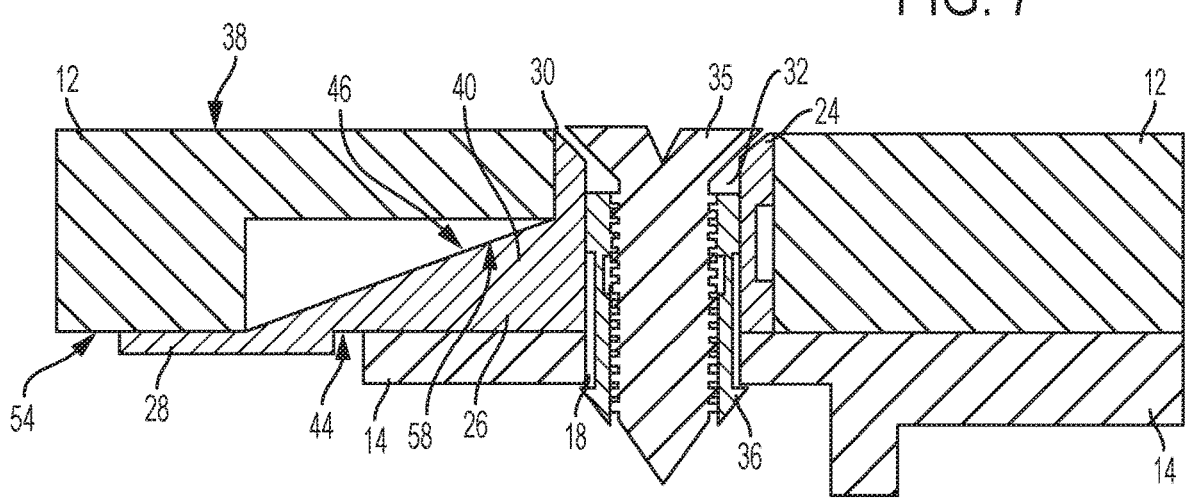
FIG. 8 is a cross-sectional view of the floor panel of FIG. 2, along lines 8-8 in FIG. 2.

Opening 32 of base 24 is sized to receive a through-fastener composed of a screw 35 and an expanding nut 36, which can be seen in FIGS. 7 and 8. Opening 32 has an interior surface, some extent of which consists of six flat faces arranged as a hex shape. This shape may engage expanding nut 36 to allow the nut to resist rotation when screw 35 is turned. At top end 37 of base 24, the interior surface flares out to a larger and more circular shape to conform to an underside of the screw's head. The opening may thereby accommodate a full extent of the screw, which may lie flush with top end 37. An offset flange insert may also be configured to receive any other appropriate blind fastener.

Referring again to FIGS. 4-6, interconnect 26 is disposed between base 24 and flange 28 and comprises two bridges 40 that connect the base and the flange. Bridges 40 extend out from base 24, and interconnect 26 further comprises a panel 42 spanning between the bridges. Panel 42 is also formed on base 24, and extends between bridges 40 such that a bottom surface of the panel is flush with a bottom edge of each bridge. Together the bottom surface of the panel and the bottom edges of the bridges form a flat bottom 44 of interconnect 26.

Bridges 40 are generally wedge shaped, with an inclined upper surface 46 and flat edge surface. Each bridge extends from a widest point proximate base 24 to a narrowest point past panel 42. In other examples, interconnect 26 may include any number of bridges, which may be of any structurally sound shape. For example, interconnect 26 may comprise one rectangular bridge extending from base 24, with flange 28 formed on a bottom surface of a distal end.

As shown in FIGS. 4-6, flange 28 is formed on the bottom edges of bridges 40, and some portion of the bottom surface of panel 42. The flange is planar, and within a plane perpendicular to vertical axis 34 that does not intersect base 24 or interconnect 26. In the pictured example, flange 28 is also kidney-shaped, comprised of a central portion 48 between a first edge portion 50 and a second edge portion 52.

An example of a blind fastener is shown in FIG. 7, fastening aligned apertures in two objects. The blind fastener comprises a screw 35 and an expanding nut 36, the expanding nut including multiple tangs each having a tab. When screw 35 is screwed into expanding nut 36, the tangs are deflected outward to engage the tabs with a bottom surface of a fastened object.

Figure 9:
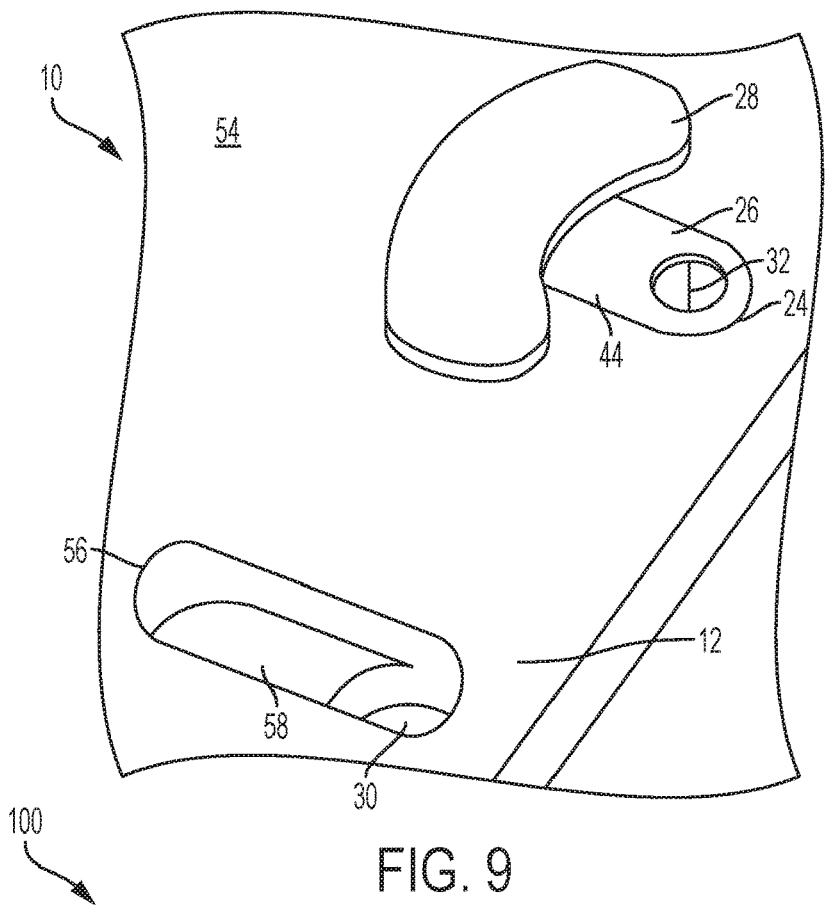
FIG. 9 is an isometric view of an example of a floor panel.

Turning to FIG. 9, floor panel 10 has a bottom face 54 opposite top face 38 and including an elongate recess 56 sized to receive interconnect 26. An example is shown of the elongate recess and an offset flange 22 received in floor panel 10. Elongate recess 56 is generally rectangular in cross section, and of sufficient depth to accommodate bridges 40. Hole 30 is shown disposed in an end of elongate recess 56, or may be adjacent to the recess.

Alternatively, elongate recess 56 may have an inclined surface conforming to inclined upper surfaces 48 of bridges 40. In examples where interconnect 26 has other shapes, elongate recess 56 may be correspondingly shaped to complement the interconnect portion. The recess may also have any shape that is simple to manufacture and accommodates interconnect 26.

FIG. 8 shows a cross-section through line 8-8 in FIGS. 2-3, of an offset flange insert 22 received in floor panel 10, the panel in turn overlapped with seat track 16. A screw 35 and an expanding nut 36 extend through opening 32 and aperture 18 to secure the floor panel to the seat track. When the insert is received in the floor panel, as shown, flange 28 contacts bottom face 54 of the floor panel. Flat bottom 44 of interconnect 26 and a bottom end of base 24 may be flush with bottom face 54, and neither base 24 nor interconnect 26 extend beyond the bottom face. Flange 28 is both bonded to bottom face 54 and parallel to the bottom face.

Floor panel 10 is disposed on seat track 16 such that edge region 12 of the floor panel overlaps lateral edge portion 14 of the seat track, with opening 32 of offset flange insert 22 aligned with one aperture of the plurality of apertures 18 in the lateral edge portion. When edge region 12 and lateral edge portion 14 are in this overlapping engagement, interconnect 26 extends laterally such that flange 28 is clear of the lateral edge portion. That is, flange 28 is not disposed between floor panel 10 and seat track 16. Floor panel 10 may contact and lie flat on seat track 16, with no gap between the floor panel and the seat track.

In FIGS. 2 and 3, seat track lateral edge 14 is scalloped and flange 28 is kidney shaped to correspond to the scallops. To put it another way, lateral edge portion 14 of seat track 16 includes a crest 60 between a first trough 62 and a second trough 64. An aperture of the plurality of seat track apertures 18 is disposed in crest 60, and opening 32 of the insert is aligned with the aperture. Central portion 48 of flange 28 is configured to be adjacent to crest 60 while first edge portion 50 is adjacent first trough 62 and second edge portion 52 is adjacent second trough 64.

A bottom surface of flange 28 may be flush with a bottom surface of lateral edge portion 14 of seat track 16. In other examples, flange 28 may be non-planar and include texturing or projections on the bottom surface.

In the pictured example, flange 28 is adjacent to, but not in contact with scalloped lateral edge 14. In other examples interconnect 26 may extend such that flange 28 is distant from rather than adjacent to the scalloped lateral edge. In such an example, flange 28 may be kidney shaped, square, round, or any other appropriate shape.

In some examples, lateral edge portion 14 of seat track 16 may be linear, or otherwise contoured. In such examples, flange 28 may be of a complementary shape, such that first edge portion 50, central portion 48, and second edge portion 52 may each be adjacent to the lateral edge portion. For example, in the case where lateral edge portion 14 is linear, flange 28 may be rectangular in shape.

Flange 28 may also be shaped to accommodate other inserts or fasteners used to connect floor panel 10 to seat track 16, fasteners used to connect other aircraft cabin components such as seats to the floor panel or seat track, or any other adjacent structures. In an alternative example, flanges 28 of multiple offset flange inserts 22 may be connected or integrally formed together as one insert configured to be received in multiple holes 30 in floor panel 10.

In another example, not shown, a floor panel connection system may be used to connect a floor panel to a cargo floor of an airplane. Any embodiment of a floor panel connection system as previously described may be used to connect a floor panel to any appropriate aircraft airframe.

Manner of Operation/Use

Figure 10:
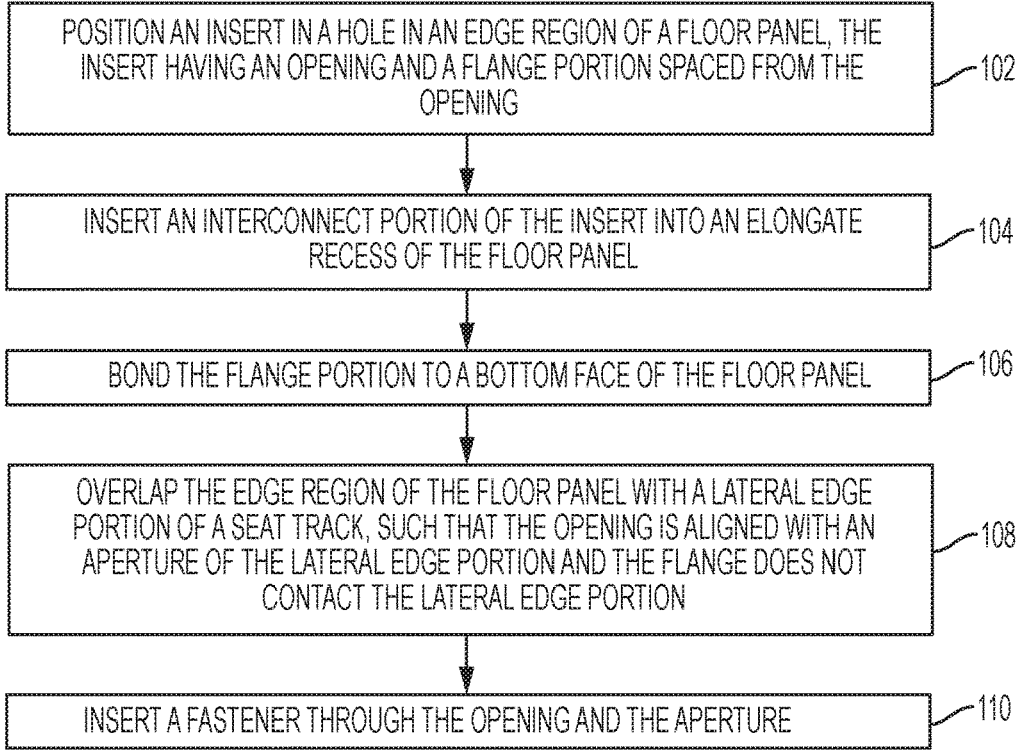
FIG. 10 is a diagrammatic representation of a flow chart illustrating a method for resisting loads on an aircraft floor panel.

FIG. 10 describes an illustrative method 100 for resisting loads on a floor panel 10 with an offset flange insert 22. The method may be used in conjunction with any of the offset flange insert examples previously described.

Method 100 includes a first step 102 of positioning offset flange insert 22 in a hole 30 of an edge region 12 of floor panel 10. Insert 22 includes a base portion 24 with an opening 32 sized to receive a fastener, and a flange portion 28. The method further includes step 104, comprising inserting an interconnect portion 26 of insert 22 into an elongate recess 56 in edge region 12, where the elongate recess is sized to receive the interconnect portion.

Step 106 comprises bonding flange portion 28 to a bottom face 54 of floor panel 10. The floor panel and offset flange insert 22 may then be manipulated as a unit. In some examples of the method, steps 102-106 may be repeated for additional offset flange inserts. Multiple inserts may be positioned and bonded to the floor panel such that a combination of the floor panel and inserts may be installed as a unit during aircraft assembly. Such steps may be performed at the time of manufacture of the floor panel, or otherwise prior to aircraft assembly.

Method 100 further includes step 108 of overlapping edge region 12 of floor panel 10 with a lateral edge portion 14 of a seat track 16, the lateral edge portion including an aperture 18 and the floor panel overlapping such that opening 32 is aligned with the aperture. In an example where multiple offset flange inserts 22 have been bonded to floor panel 10, the floor panel may be positioned such that the opening 32 of each insert 22 is aligned with one of a plurality of apertures in the lateral edge portion of seat track 16.

Step 110 of method 100 comprises inserting a fastener through opening 32 and aperture 18. Any appropriate blind fastener may be used. In some examples, the fastener may include a screw and an expanding nut. In such an example, the method may include inserting the expanding nut through opening 32 and aperture 18 and then screwing the screw into the expanding nut such that an end portion of the expanding nut engages lateral edge portion 14 of seat track 16.

Although various steps of methods 100 are described above and depicted in FIG. 10, the steps need not necessarily all be performed, in some cases may be performed in a different order than the order shown, and in some cases may be performed simultaneously.

Additional Examples

This section describes additional aspects and features of examples, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A. A floor panel connection system, comprising:

an aircraft airframe having a lateral edge portion with a plurality of apertures;

a floor panel having an edge region configured for overlapping engagement with the lateral edge portion of the airframe, the edge region includes a hole; and an insert having a base portion, a flange portion, and an interconnect portion disposed between the base and flange portions, the base portion is configured to be received in the hole, the base portion includes an opening sized to receive at least one fastener, the interconnect portion extends laterally from the base portion such that the flange portion is beyond the lateral edge portion of the airframe when (1) the base portion is received in the hole and (2) the lateral edge portion and the edge region are in overlapping engagement.

A1. The system of A, wherein the edge region of the floor panel includes an elongate recess sized to receive the interconnect portion, and wherein the flange portion contacts the floor panel when (a) the base portion is received in the hole and (b) the interconnect portion is received in the elongate recess.

A2. The system of A1, wherein the floor panel includes a bottom surface, and wherein, when (a) the base portion is received in the hole and (b) the interconnect portion is received in the elongate recess, the flange portion contacts the bottom surface and the base portion and the interconnect portion do not extend beyond the bottom surface.

A3. The system of A1, wherein the interconnect portion includes at least one bridge that connects the base portion to the flange portion.

A4. The system of A3, wherein the bridge includes at least one inclined surface, and the elongate recess includes an inverted inclined surface that is complementary to the corresponding at least one inclined surface of the bridge.

A5. The system of A1, wherein the hole is within an end of the elongate recess of the edge region.

A6. The system of any one of A to A5, wherein the flange portion is bonded to a bottom surface of the floor panel.

A7. The system of any one of A to A6, wherein the lateral edge portion of the airframe is scalloped, and the flange portion of the insert is kidney-shaped to correspond to the scalloped lateral edge portion.

A8. The system of A7, wherein the lateral edge portion includes a crest disposed between first and second troughs, and the flange portion includes a central portion disposed between first and second end portions, the first and second end portions are configured to be adjacent to the first and second troughs, respectively, when (1) the base portion is received in the hole and (2) the lateral edge portion and the edge region are in overlapping engagement.

A9. The system of A8, wherein the central portion of the flange portion is configured to be adjacent to the crest of the lateral edge portion when (1) the base portion is received in the hole and (2) the lateral edge portion and the edge region are in overlapping engagement.

A10. The system of any one of A to A9, wherein the base portion is substantially cylindrical.

A11. The system of any one of A to A10, wherein the flange portion is planar.

A12. The system of A11, wherein the planar flange portion is parallel to the bottom surface of the floor panel when (a) the base portion is received in the hole and (b) the interconnect portion is received in the elongate recess.

A13. The system of A11, wherein the opening of the base portion includes a vertical axis, the planar flange portion is within a plane that is perpendicular to the vertical axis, and the base and interconnect portions are not within the plane.

A14. The system of any one of A to A13, wherein the opening of the base portion is sized to receive a screw and an expanding nut.

A15. The system of any one of A to A14, wherein the airframe is a seat track.

B. A floor panel assembly for an aircraft, comprising:
a planar expanse having a top face, a bottom face, an edge region, and a hole in the edge region;
an insert having a base portion and a flange portion, the base portion is configured to be received in the hole of the edge region and the flange portion is configured to be bonded to the bottom face adjacent the hole but beyond a lateral edge portion of an airframe when the edge region is in overlapping engagement with the lateral edge portion of the airframe.

B1. The floor panel assembly of B, wherein the insert further includes an interconnect portion disposed between the base and flange portions, the edge region includes an elongate recess adjacent to the hole and sized to receive the interconnect portion, and wherein the flange portion contacts the bottom face when (a) the base portion is received in the hole and (b) the interconnect portion is received in the elongate recess.

B2. The floor panel assembly of B1, wherein, when (a) the base portion is received in the hole and (b) the interconnect portion is received in the elongate recess, the flange portion contacts the bottom face and the base portion and the interconnect portion do not extend beyond the bottom face.

B3. The floor panel assembly of any one of B to B2, wherein the interconnect portion includes at least one bridge that connects the base portion to the flange portion.

B4. The floor panel assembly of B2, wherein the bridge includes at least one inclined surface, and the elongate recess includes an inverted inclined surface that is complementary to the corresponding at least one inclined surface of the bridge.

B5. The system of B1, wherein the hole is within an end of the elongate recess of the edge region.

B6. The floor panel assembly of any one of B to B5, where the lateral edge portion of the airframe is scalloped, and wherein the flange portion of the insert is kidney-shaped to correspond to the scalloped lateral edge portion.

C. An insert configured to be received in a hole of an aircraft floor panel, comprising:
a base portion having an opening sized to receive at least one fastener, the opening having a vertical axis;
a planar flange portion; and
an interconnect portion disposed between the base portion and the planar flange portion, the planar flange portion is within a plane that is perpendicular to the vertical axis, wherein the base and interconnect portions are not within the plane.

C1. The insert of C, wherein the interconnect portion includes at least one bridge that connects the base portion to the flange portion.

C2. The system of C1, wherein the bridge includes at least one inclined surface.

C3. The system of any one of C to C2, wherein the flange portion is kidney-shaped.

C4. The system of any one of C to C3, wherein the base portion is substantially cylindrical.

C5. The system of any one of C to C4, wherein the opening of the base portion is sized to receive a screw and an expanding nut.

D. A method of resisting loads on an aircraft floor panel, comprising:
positioning an insert in a hole of an edge region of a floor panel, the insert includes a base portion and a flange portion, the base portion including an opening sized to receive at least one fastener;
overlapping an edge region of the floor panel with a lateral edge portion of an airframe such that the opening is aligned with an aperture of the lateral edge portion, the flange portion is configured to be spaced from the opening such that the flange does not contact the lateral edge portion when the lateral edge portion is overlapped with the edge region; and
inserting a fastener through the opening and the aperture to attach the floor panel to the airframe.

D1. The method of D, where the insert further includes an interconnect portion disposed between the base and flange portions, and where the edge region of the floor panel includes an elongate recess sized to receive the interconnect portion, wherein positioning an insert includes inserting the interconnect portion into the elongate recess.

D2. The method of any one of D to D1, wherein positioning an insert includes bonding the flange portion to a bottom face of the floor panel.

D3. The method of any one of D to D2, wherein inserting a fastener includes: (a) inserting an expanding nut through the opening of the base portion and through the aperture of the lateral edge portion, and (b) inserting a screw through an opening of the expanding nut, such that an end portion of the expanding nut engages the lateral edge portion.

Advantages, Features, Benefits

The different examples of the floor panel connection system described herein provide several advantages over known solutions for connecting floor panels to airplane airframes. For example, the illustrative examples of an offset flange insert described herein allow the floor panel to lie flush along the airframe. Additionally, and among other benefits, illustrative examples of the offset flange insert described herein do not concentrate forces on the floor panel. No known system or device can perform these functions, particularly without added weight. Thus, the illustrative examples described herein are particularly useful for reducing weight of floor panel connections. However, not all examples described herein provide the same advantages or the same degree of advantage.

CONCLUSION

The disclosure set forth above may encompass multiple distinct inventions with independent utility. Although each of these inventions has been disclosed in its preferred form(s), the specific examples thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A floor panel assembly for an aircraft, comprising:
a planar expanse having a top face, a bottom face, an edge region, and a hole in the edge region; and
an insert having a base portion and a flange portion, the base portion being configured to be received in the hole of the edge region and the flange portion being configured to be bonded to the bottom face adjacent the hole but beyond a lateral edge portion of an airframe when the edge region is in overlapping engagement with the lateral edge portion of the airframe.

2. The floor panel assembly of claim 1, wherein the insert further includes an interconnect portion disposed between the base and flange portions, the edge region includes an elongate recess adjacent to the hole and sized to receive the interconnect portion, and wherein the hole is within an end of the elongate recess of the edge region.

3. The floor panel assembly of claim 2, wherein the interconnect portion includes at least one bridge that connects the base portion to the flange portion.

4. The floor panel assembly of claim 1, wherein the flange portion is planar, and the base portion includes a vertical axis, the planar flange portion is within a plane that is perpendicular to the vertical axis, and the base is not within the plane.

5. The floor panel assembly of claim 1, wherein the base portion of the insert includes an opening sized to receive at least one fastener.

6. The floor panel assembly of claim 5, further including a fastener configured to be inserted through the opening of the base portion of the insert and an aperture of the airframe.

7. A floor panel connection system, comprising:
an aircraft airframe having a lateral edge portion with a plurality of apertures;
a planar expanse having an edge region configured for overlapping engagement with the lateral edge portion of the airframe, the edge region including a hole; and
an insert having a base portion and a flange portion, the base portion being configured to be received in the hole of the edge region and the flange portion being configured to be bonded to a bottom face of the planar expanse adjacent the hole but beyond a lateral edge portion of the aircraft airframe when the edge region is in overlapping engagement with the lateral edge portion of the airframe.

8. The floor panel connection system of claim 7, wherein the base portion includes an opening configured to align with an aperture of the plurality of apertures of the aircraft airframe.

9. The floor panel connection system of claim 8, further including a fastener configured to be inserted through the opening of the base portion when the opening is in alignment with the aperture of the aircraft airframe.

10. The floor panel connection system of claim 7, wherein the insert further includes an interconnect portion disposed between the base and flange portions, and the edge region includes an elongate recess adjacent to the hole and sized to receive the interconnect portion.

11. The floor panel connection system of claim 10, wherein the hole is within an end of the elongate recess of the edge region.

12. The floor panel connection system of claim 10, wherein the interconnect portion includes at least one bridge that connects the base portion to the flange portion.

13. The floor panel connection system of claim 10, wherein the flange portion is planar, and the base portion includes a vertical axis, the planar flange portion is within a plane that is perpendicular to the vertical axis, and the base portion and interconnect portions are not within the plane.

14. A method of assembling a floor panel of an airplane, comprising:
positioning an insert in a hole of an edge region of a planar expanse, the insert including a base portion and a flange portion;
bonding the flange portion of the insert to a bottom face of the planar expanse, adjacent the hole of the edge region;
overlapping the edge region of the planar expanse with a lateral edge portion of an airframe such that the flange portion of the insert does not contact the lateral edge portion of the airframe.

15. The method of claim 14, wherein overlapping the edge region of the planar expanse with the lateral edge portion of the airframe includes aligning an opening of the base portion of the insert with an aperture of the airframe.

16. The method of claim 15, further including:
inserting a fastener through the opening of the base portion of the insert and the aperture of the airframe to attach the planar expanse to the airframe.

17. The method of claim 16, wherein inserting a fastener includes: (a) inserting an expanding nut through the opening of the base portion and through the aperture of the lateral edge portion, and (b) inserting a screw through an opening of the expanding nut, such that an end portion of the expanding nut engages the lateral edge portion.

18. The floor panel connection system of claim 10, wherein the flange portion contacts the bottom face when (a) the base portion is received in the hole and (b) the interconnect portion is received in the elongate recess.

19. The floor panel connection system of claim 18, wherein, when (a) the base portion is received in the hole and (b) the interconnect portion is received in the elongate recess, the flange portion contacts the bottom face and the base portion and the interconnect portion do not extend beyond the bottom face.

20. The floor panel connection system of claim 7, wherein the lateral edge portion of the airframe is scalloped, and the flange portion of the insert is kidney-shaped to correspond to the scalloped lateral edge portion.

* * * * *